(12) United States Patent
Youn et al.

(10) Patent No.: US 9,998,980 B2
(45) Date of Patent: Jun. 12, 2018

(54) WIRELESS POWER TRANSMITTER AND RECEIVER

(71) Applicant: LG ELECTRONICS INC., Seoul (KR)

(72) Inventors: Myungjune Youn, Seoul (KR); Taehun Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/473,223

(22) Filed: Mar. 29, 2017

(65) Prior Publication Data

US 2017/0289898 A1   Oct. 5, 2017

Related U.S. Application Data

(60) Provisional application No. 62/314,418, filed on Mar. 29, 2016, provisional application No. 62/318,230, filed on Apr. 5, 2016, provisional application No. 62/358,163, filed on Jul. 5, 2016.

(51) Int. Cl.
| | |
|---|---|
| *H04W 8/00* | (2009.01) |
| *H04W 40/24* | (2009.01) |
| *H04B 7/185* | (2006.01) |
| *H04W 48/08* | (2009.01) |
| *H04W 72/04* | (2009.01) |
| *H04W 64/00* | (2009.01) |
| *H04W 72/10* | (2009.01) |

(Continued)

(52) U.S. Cl.
CPC ........... *H04W 48/08* (2013.01); *H04W 64/00* (2013.01); *H04W 72/0493* (2013.01); *H04W 72/10* (2013.01); *H04W 76/026* (2013.01); *H04M 2250/10* (2013.01); *H04W 88/06* (2013.01)

(58) Field of Classification Search
CPC ..... H04W 8/005; H04W 40/24; H04W 48/08; H04W 76/026; H04W 72/10; H04W 64/00; H04W 72/0493; H04W 72/1247; H04W 88/06; H04B 17/318; H04B 3/544; H04B 7/18558; H04B 17/382; H04M 2250/10

See application file for complete search history.

(56) References Cited

U.S. PATENT DOCUMENTS

| | | | | |
|---|---|---|---|---|
| 2013/0034019 | A1* | 2/2013 | Mustajarvi | H04W 48/16 370/254 |
| 2014/0364079 | A1* | 12/2014 | DiFazio | H04W 88/04 455/404.1 |

(Continued)

*Primary Examiner* — Andrew Wendell

(74) *Attorney, Agent, or Firm* — Lee Hong Degerman Kang Waimey

(57) ABSTRACT

An operation method of a network node for supporting network discovery and selection of a user equipment (UE) includes receiving a network discovery and selection (NDS) rule request message requesting an NDS rule from the UE, transmitting a policy request message requesting NDS rule generation support information for generating the NDS rule to at least another network node, receiving a policy response message including the NDS rule generation support information from the at least another network node, generating an NDS rule on the basis of the NDS rule request message and the policy response message, and transmitting an NDS rule response message including the generated NDS rule to the UE.

20 Claims, 12 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 2015/0201371 A1* | 7/2015 | Tamura | H04W 48/16 370/259 |
| 2015/0208335 A1* | 7/2015 | Vrbaski | H04W 48/18 455/426.1 |
| 2015/0215832 A1* | 7/2015 | Fitzpatrick | H04W 36/04 455/426.1 |
| 2016/0021582 A1* | 1/2016 | Yu | H04W 48/18 455/436 |
| 2016/0135116 A1* | 5/2016 | Chen | H04W 48/14 455/450 |
| 2016/0234760 A1* | 8/2016 | Orlandi | H04W 48/14 |
| 2017/0078936 A1* | 3/2017 | Bergstrom | H04W 48/18 |

* cited by examiner

【Fig. 1】
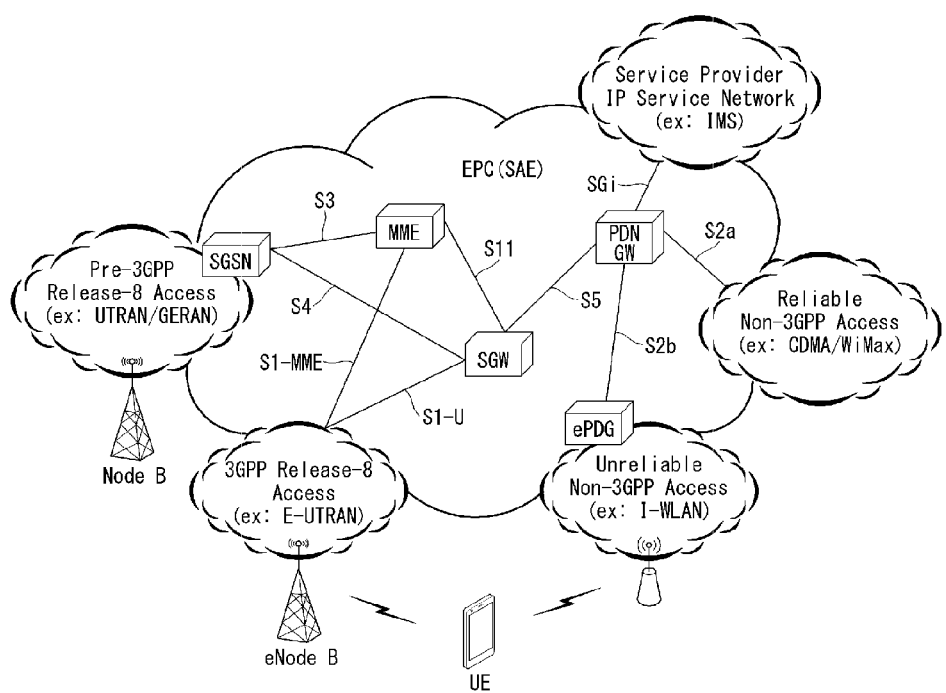

[Fig. 2]
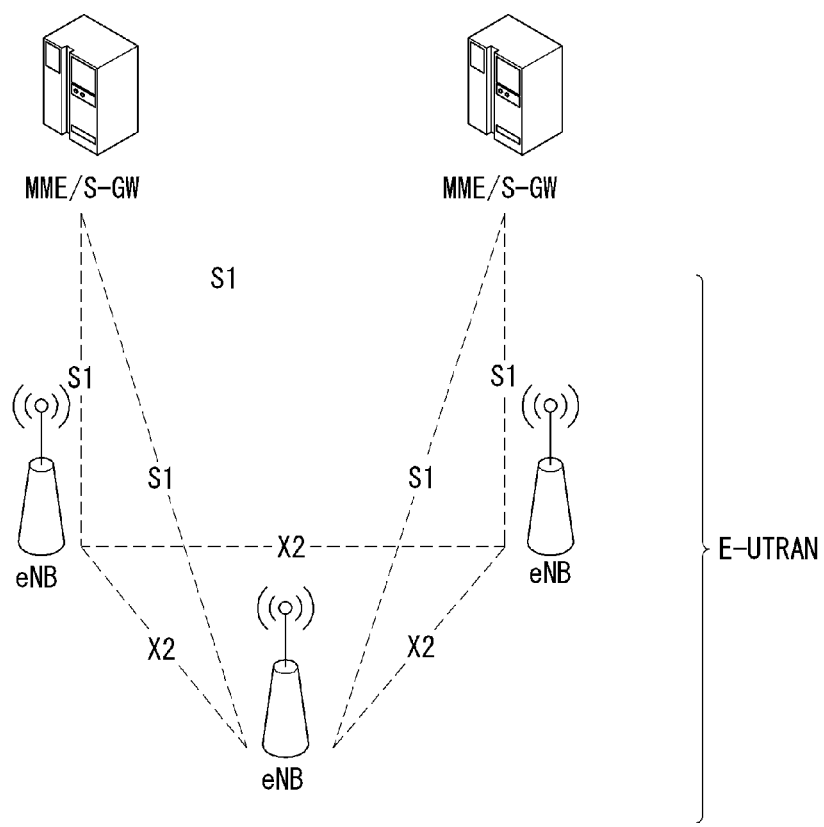

【Fig. 3】
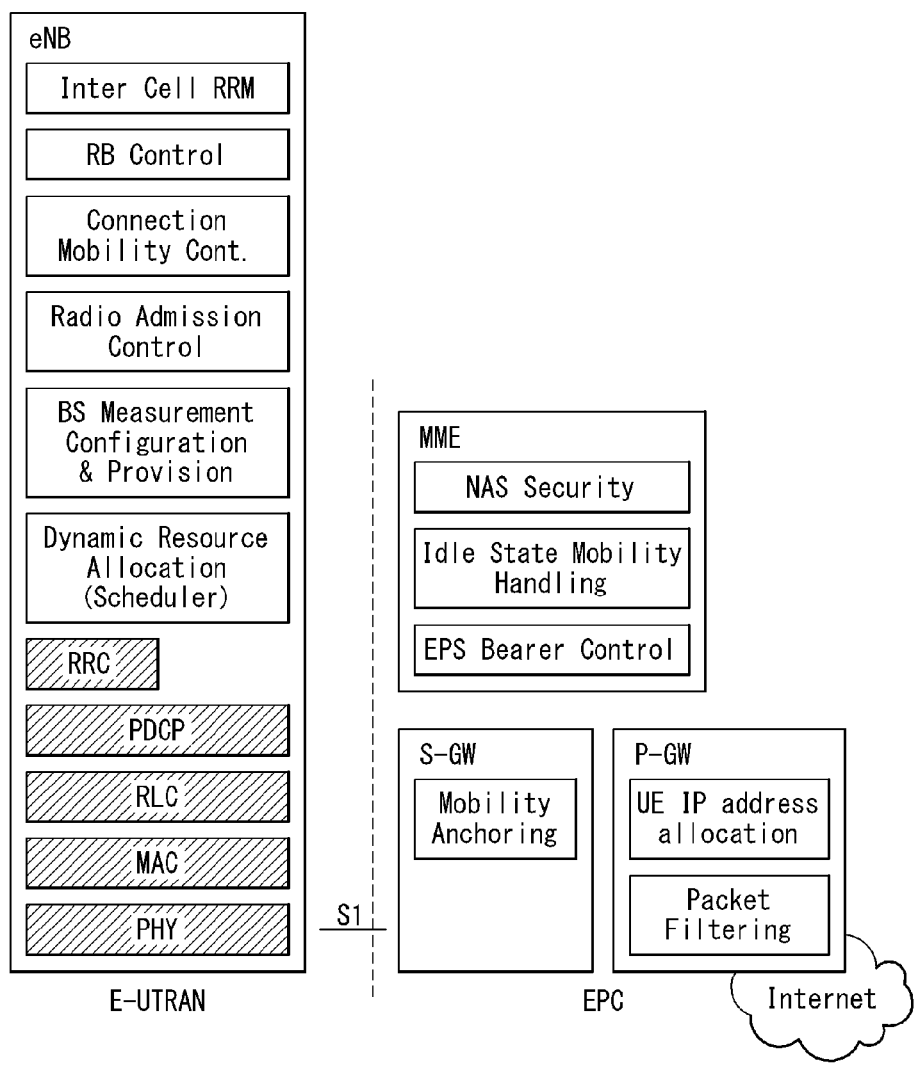

[Fig. 4]
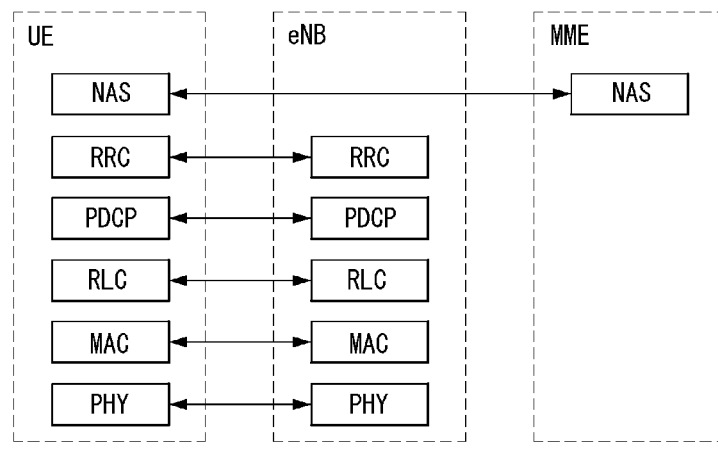
(a) Control Plane Protocol Stack
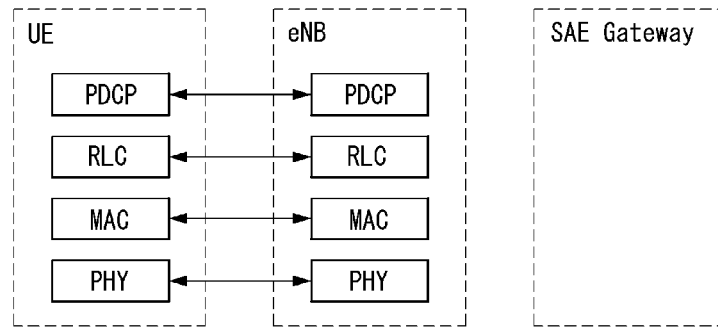
(b) User Plane Protocol Stack 【Fig. 5】
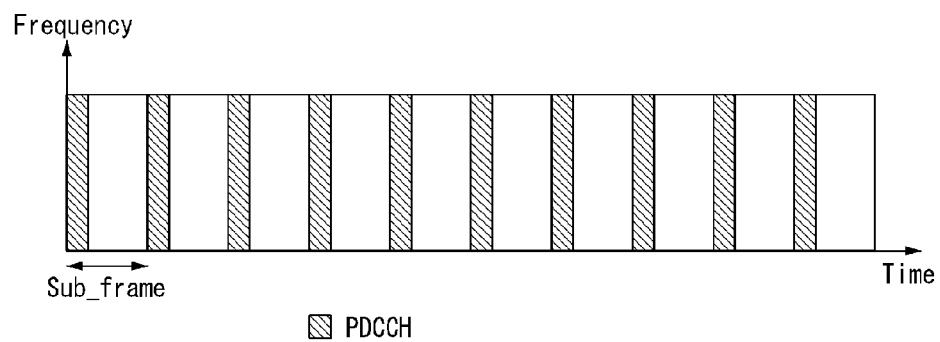
【Fig. 6】
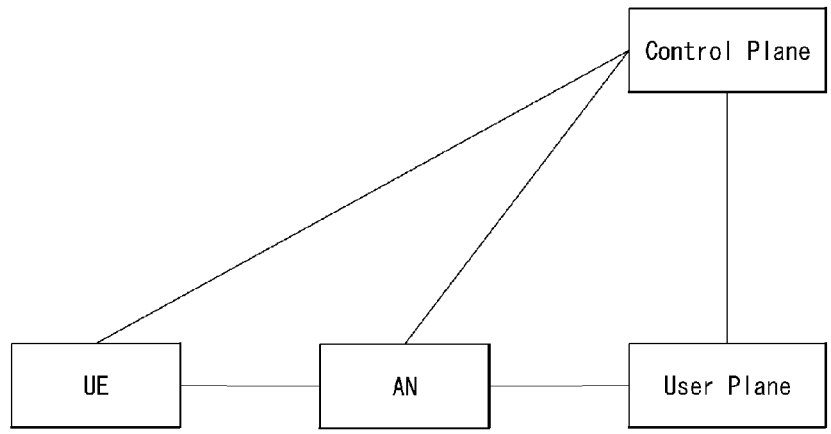

[Fig. 7]
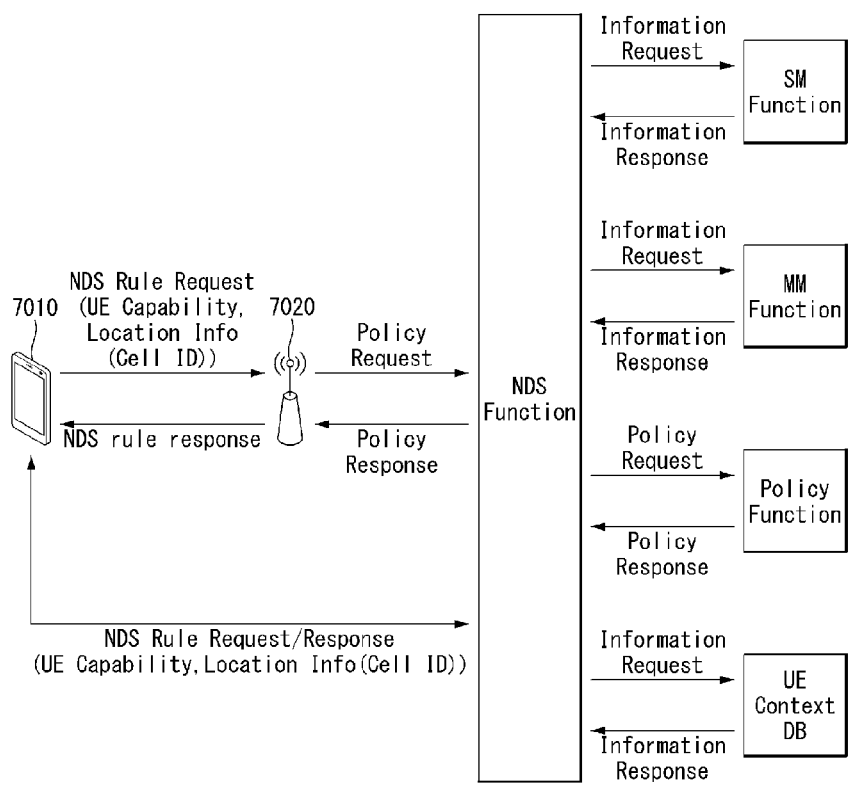

[Fig. 8]
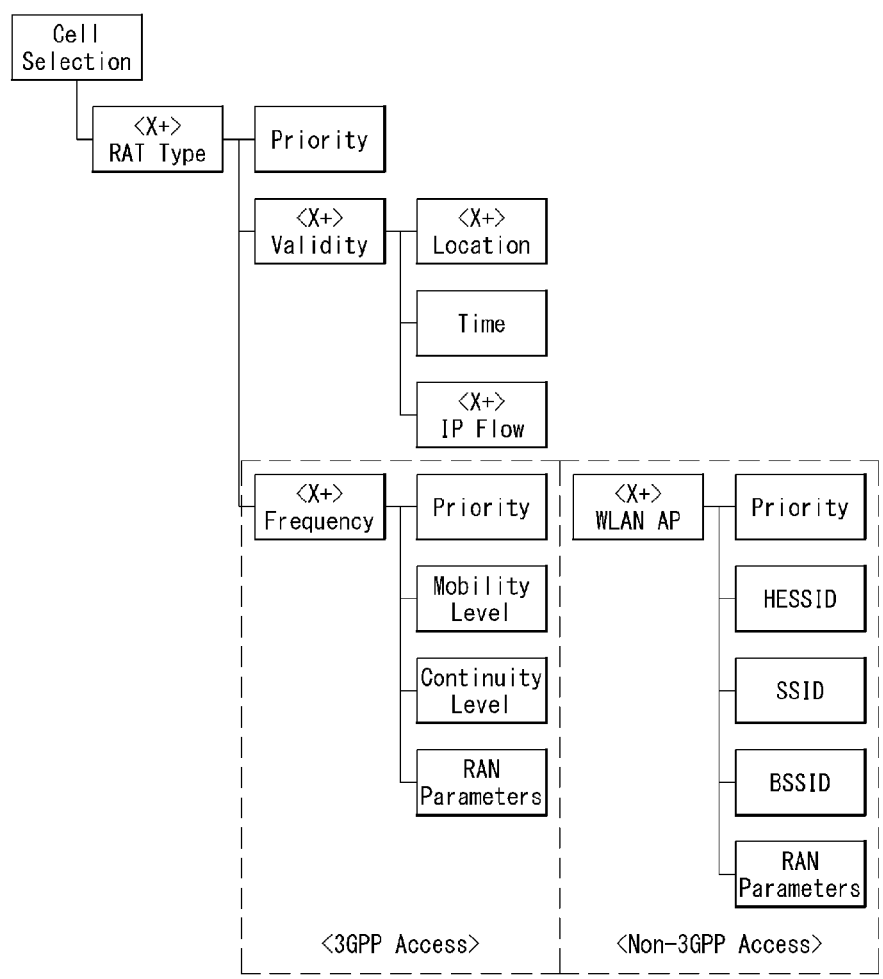

[Fig. 9]
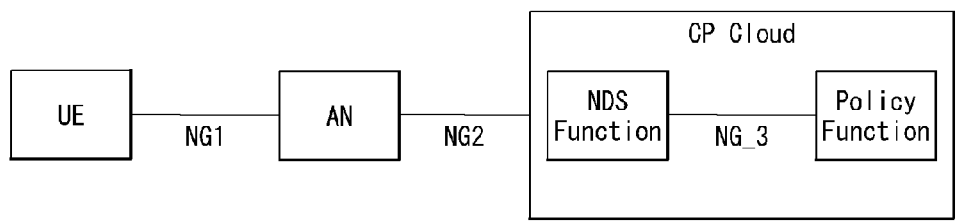
[Fig. 10]
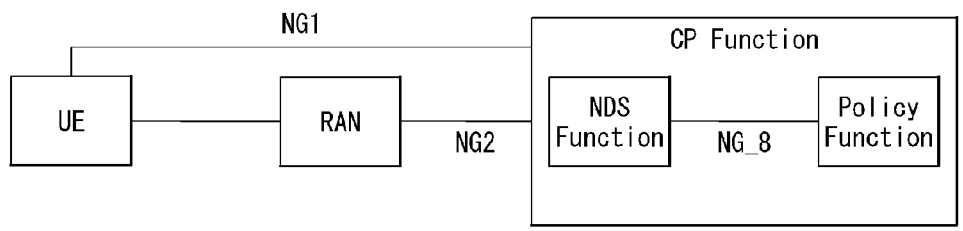

[Fig. 11]
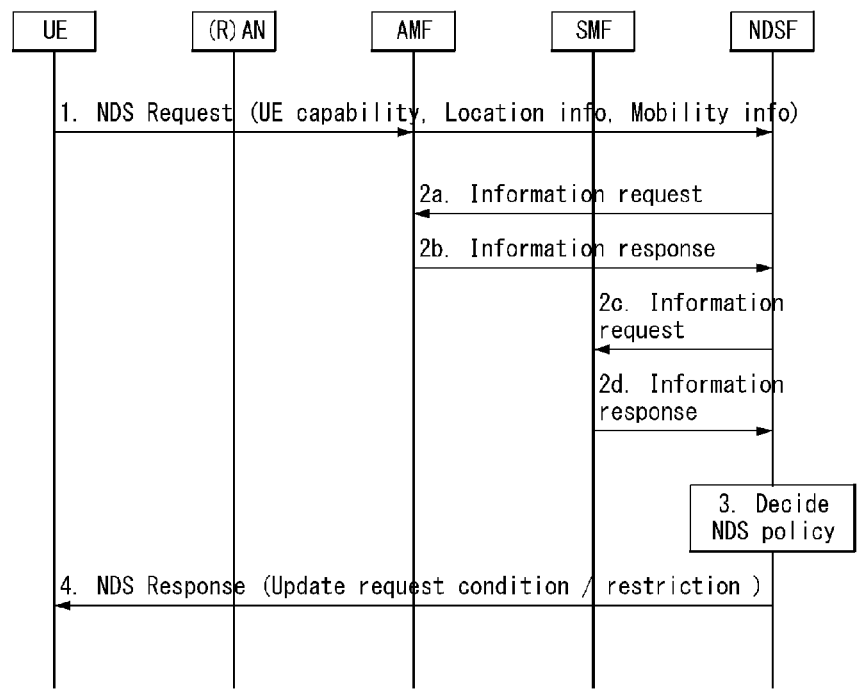

[Fig. 12]
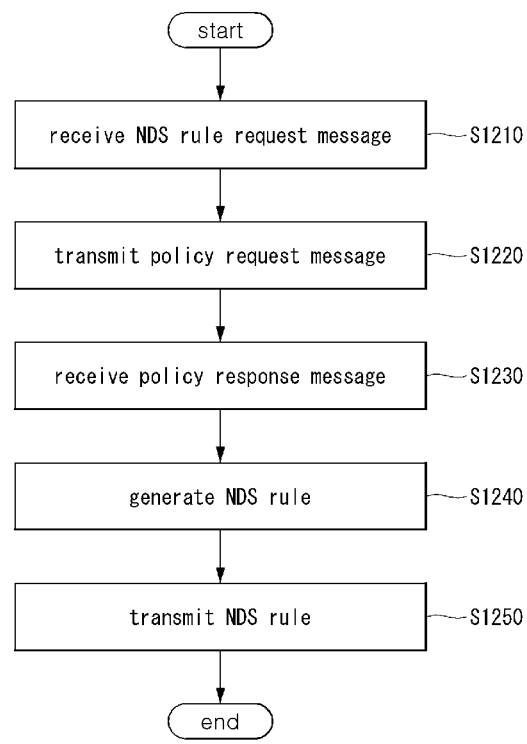

[Fig. 13]
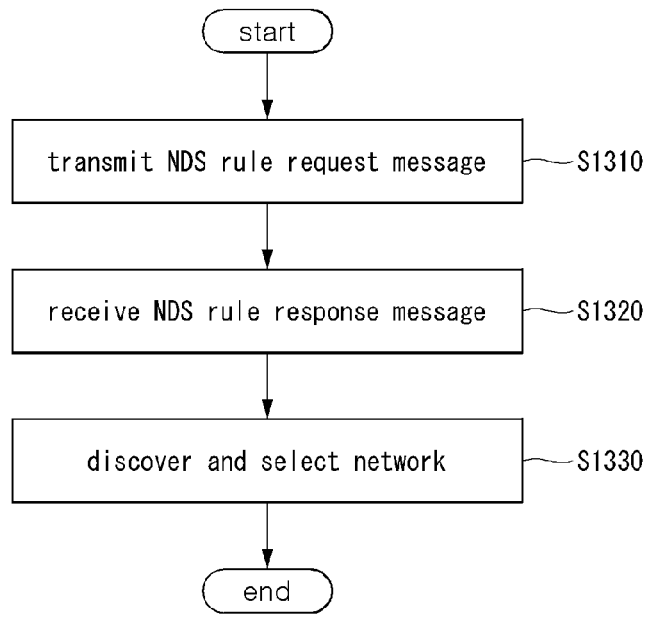
[Fig. 14]
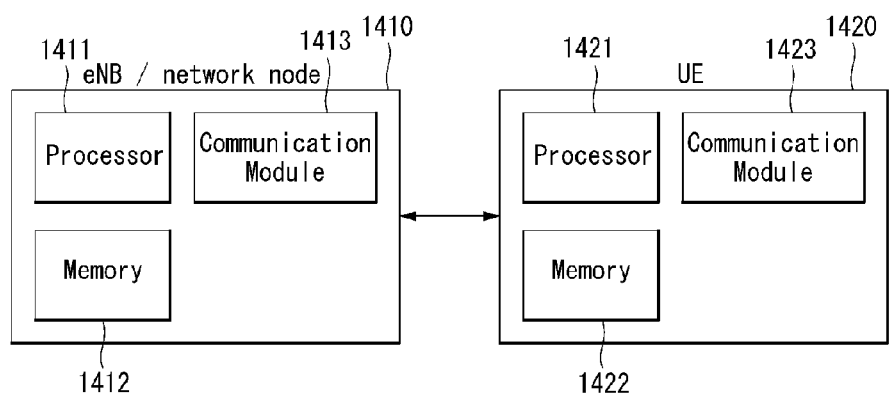

【Fig. 15】
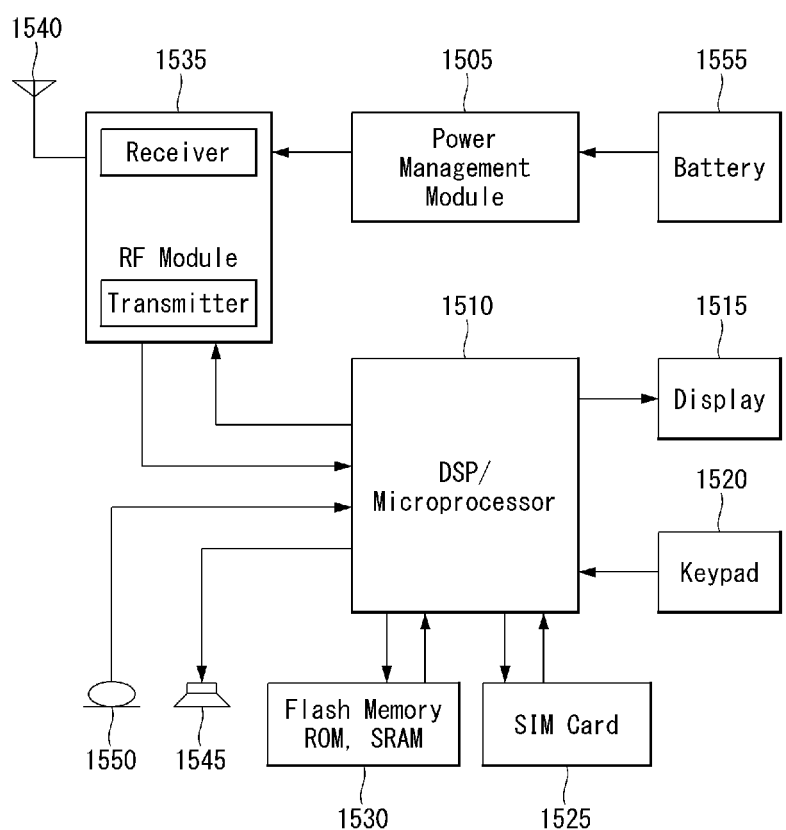

WIRELESS POWER TRANSMITTER AND RECEIVER

CROSS-REFERENCE TO RELATED APPLICATIONS

Pursuant to 35 U.S.C. § 119(e), this application claims the benefit of U.S. Provisional Patent Application No. 62/314,418, filed on Mar. 29, 2016, 62/318,230, filed on Apr. 5, 2016, and 62/358,163, filed on Jul. 5, 2016, the contents of which are all hereby incorporated by reference herein in their entirety.

BACKGROUND

1. Field

The present disclosure relates to a wireless communication system and, more particularly, to a method for supporting a user equipment in discovering and selecting a network and a device therefor.

2. Description of Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY

In an LTE network, a UE is supposed to separately receive information used for selecting a 3GPP access network and information used for selecting a non-3GPP access network from different network entities. Thus, since procedures for selecting the 3GPP access network and the non-3GPP access network are not standardized, it is not easy for an operator to flexibly cooperatively operate a UE with the 3GPP access network and the non-3GPP access network. Also, since a UE or a network uses different access network selection schemes/procedures according to access network types, complexity of the UE and the network is increased.

An aspect of the present disclosure is to solve the aforementioned problems by standardizing procedures for selecting a 3GPP access network and a non-3GPP access network. The technical problems of the present invention are not limited to the above-described technical problems and the other technical problems will be understood by those skilled in the art from the following description.

According to an aspect of the present disclosure, an operation method of a network node for supporting network discovery and selection of a user equipment (UE) in a wireless communication system includes: receiving a network discovery and selection (NDS) rule request message requesting an NDS rule from the UE; transmitting a policy request message requesting NDS rule generation support information for generating the NDS rule to at least another network node; receiving a policy response message including the NDS rule generation support information from the at least another network node; generating an NDS rule on the basis of the NDS rule request message and the policy response message; and transmitting an NDS rule response message including the generated NDS rule to the UE, wherein the NDS rule includes information regarding networks available to be discovered and selected by the UE and priority information of the networks, and at least some of the networks have different radio access technology (RAT) types.

The NDS rule request message may include capability information regarding an RAT type supported by the UE and/or location information of the UE.

The RAT type may correspond to UTRAN (universal terrestrial radio access network), GERAN (Global Evolution Radio Access Network), E-UTRAN (evolved universal terrestrial radio access network), evolved E-UTRAN, NEW RAT, WLAN (Wireless Local Area Network), fixed broadband access network and/or Bluetooth network.

The location information of the UE may include information regarding a cell in which the UE is camped, a tracking area and/or GPS (Global Positioning System).

The NDS rule generation support information may include session continuity support information indicating whether a session established in the UE is a session requiring continuity.

When the session continuity support information indicates that the session established for the UE is a session requiring continuity, the generating of an NDS rule may include setting highest priority, starting sequentially from a network with widest coverage, among networks included in the NDS rule.

The NDS rule request message or the NDS rule generation support information may include mobility information regarding a movement frequency level of the UE.

When the mobility information indicates that the movement frequency level of the UE is lower than a preset reference, the generating of an NDS rule may include setting highest priority, starting sequentially from a network with highest throughput among networks included in the NDS rule.

The NDS rule may include information regarding a condition for the UE to request the NDS rule.

The condition may be set to a case in which a movement frequency level of the UE is changed to be greater than a preset reference and/or to a case in which a session requiring continuity is newly established in the UE.

According to another aspect of the present disclosure, a network discovery and selection method of a user equipment (UE) in a wireless communication system includes: transmitting a network discovery and selection (NDS) rule request message requesting an NDS rule to a network, the NDS rule request message including capability information regarding a radio access technology (RAT) type supported by the UE and location information of the UE; receiving an NDS rule response message including an NDS rule generated on the basis of the NDS rule request message from the network node; and discovering and selecting a network on the basis of the NDS rule, wherein the NDS rule includes information regarding networks available to be discovered and selected by the UE, priority information of the networks, and minimum signal strength information set for each network, and at least some of the networks have different RAT types.

The network discovery and selection method may further include: performing radio frequency (RF) scanning on the networks in order indicated by the priority information.

The discovering and selecting of a network on the basis of the NDS rule may be selecting a network with higher priority among networks having a signal strength obtained through the RF scanning measured to be stronger than a minimum signal strength set for each network.

When the NDS rule includes multiple access information regarding a plurality of networks that the UE is able to simultaneously access, the discovering and selecting of a network on the basis of the NDS rule may be simultaneously selecting the plurality of networks indicated by the multiple access information.

According to another aspect of the present disclosure, a network node for supporting network discovery and selection in a wireless communication system includes: a communication module transmitting and receiving a signal; and a processor controlling the communication module, wherein the processor receives a network discovery and selection (NDS) rule request message requesting an NDS rule from the UE, transmits a policy request message requesting NDS rule generation support information for generating the NDS rule to at least another network node, receives a policy response message including the NDS rule generation support information from the at least another network node, generates an NDS rule on the basis of the NDS rule request message and the policy response message, and transmits an NDS rule response message including the generated NDS rule to the UE, wherein the NDS rule includes information regarding networks available to be discovered and selected by the UE and priority information of the networks, and at least some of the networks have different radio access technology (RAT) types.

The NDS rule request message may include capability information regarding an RAT type supported by the UE and/or location information of the UE.

The RAT type may correspond to UTRAN (universal terrestrial radio access network), GERAN (Global Evolution Radio Access Network), E-UTRAN (evolved universal terrestrial radio access network), evolved E-UTRAN, NEW RAT, WLAN (Wireless Local Area Network), fixed broadband access network and/or Bluetooth network.

The location information of the UE may include information regarding a cell in which the UE is camped, a tracking area and/or GPS (Global Positioning System).

The NDS rule generation support information may include session continuity support information indicating whether a session established in the UE is a session requiring continuity.

When the session continuity support information indicates that the session established for the UE is a session requiring continuity, the processor may set highest priority, starting sequentially from a network with widest coverage, among networks included in the NDS rule.

BRIEF DESCRIPTION OF DRAWINGS

The above and other aspects, features, and advantages of the present disclosure will be more clearly understood from the following detailed description taken in conjunction with the accompanying drawings, in which:

FIG. 1 illustrates an Evolved Packet System (EPS) to which the present invention can be applied.

FIG. 2 illustrates an example of a structure of an evolved universal terrestrial radio access network (E-UTRAN) to which the present invention can be applied FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a basic network structure to which the present invention can be applied.

FIG. 7 illustrates a network discovery and selection architecture to which the present invention can be applied.

FIG. 8 illustrates a management object (MO) of NDS rule/information according to an embodiment of the present invention.

FIG. 9 illustrates a network discovery and selection architecture to which the proposed solution can be applied.

FIG. 10 represents a network discovery and selection architecture for the proposed second solution.

FIG. 11 is a flow chart illustrating a network discovery and selection method of a UE according to an embodiment of the present invention.

FIG. 12 is a flow chart illustrating an operation method of a network node for supporting network discovery and selection of a UE according to an embodiment of the present invention.

FIG. 13 is a flow chart illustrating a network discovery and selection method of a UE according to an embodiment of the present invention.

FIG. 14 is a block diagram illustrating a configuration of a communication device according to an exemplary embodiment of the present invention.

FIG. 15 is a block diagram illustrating a configuration of a communication device according to an exemplary embodiment of the present invention.

DETAILED DESCRIPTION

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP, Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Hereinafter, the present invention will be described based on the defined terms.

System to which the Present Invention can be Applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides a more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or P-GW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

TABLE 1

| Reference point | Description |
| --- | --- |
| S1-MME | Reference point for the control plane protocol between E-UTRAN and MME |

TABLE 1-continued

| Reference point | Description |
| --- | --- |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reachability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE_ACTIVE state. As described above, a gateway within the EPC may perform a function of origination, LTE_IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied.

FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a re-configuration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Cell Selection and Reselection

UE shall perform measurements for cell selection and reselection purposes.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on idle mode measurements and cell selection criteria.

In order to speed up the cell selection process, stored information for several RATs may be available in the UE.

When camped on a cell, the UE shall regularly search for a better cell according to the cell reselection criteria. If a better cell is found, that cell is selected. The change of cell may imply a change of RAT.

The NAS is informed if the cell selection and reselection results in changes in the received system information relevant for NAS.

For normal service, the UE shall camp on a suitable cell, tune to that cell's control channel(s) so that the UE can:
Receive system information from the PLMN; and
receive registration area information from the PLMN, e.g., tracking area information; and
receive other AS and NAS Information; and
if registered:
  receive paging and notification messages from the PLMN; and
  initiate transfer to connected mode.

The UE shall use one of the following two cell selection procedures:

a) Initial Cell Selection

This procedure requires no prior knowledge of which RF channels are E-UTRA or NB-IoT carriers. The UE shall scan all RF channels in the E-UTRA bands according to its capabilities to find a suitable cell. On each carrier frequency, the UE need only search for the strongest cell. Once a suitable cell is found this cell shall be selected.

b) Stored Information Cell Selection

This procedure requires stored information of carrier frequencies and optionally also information on cell parameters, from previously received measurement control information elements or from previously detected cells. Once the UE has found a suitable cell the UE shall select it. If no suitable cell is found the Initial Cell Selection procedure shall be started.

Priorities between different frequencies or RATs provided to the UE by system information or dedicated signalling are not used in the cell selection process.

Network Discovery and Selection

Access network selection and traffic steering between 3GPP access and WLAN is supported using ANDSF (Access Network Discovery and Selection Function) and is also supported using RAN rule procedures without AN DS F.

The following principles apply when the UE is registered in the Home PLMN or in a PLMN which is equivalent to the home PLMN and when both 3GPP and non-3GPP accesses are available or when multiple non-3GPP accesses are available:

The EPS network may provide the UE with assistance data/policies about available accesses located in the Home PLMN or in a PLMN equivalent to the Home PLMN, to allow the UE to scan for accesses and select an access.

If the UE is capable of routing different IP flows to the same PDN connection through different access networks, the EPS network shall allow the operator to influence the access where a specific IP flow shall be routed.

If the UE is capable of routing different simultaneously active PDN connections through different access networks, the EPS network shall allow the operator to influence the access where a specific PDN connection shall be routed.

Assistance data/policies are provided only after establishing secure communication.

The assistance data/policies provided to UE may depend on the UE's subscription data.

The EPS network allows the operator to influence the access that the UE shall handover to (when in active mode) or re-select (when in idle mode).

Multi-access network discovery and selection works for both single-radio and multiple-radio terminals. For the case of multiple-radio terminals, multi-access network discovery and selection works without requiring all radios supported by the UE to be switched on.

No architectural impact is foreseen for network selection upon initial network attachment.

The UE may provide information to the network for the retrieval of the assistance data/policies.

The following principles apply when the UE is registered in a Visited PLMN (VPLMN) and when both 3GPP and non-3GPP accesses are available or when multiple non-3GPP accesses are available:

The VPLMN shall be able to provide Access Network Discovery information only for 3GPP and non-3GPP access networks that provide connectivity to the VPLMN or to a PLMN equivalent to the VPLMN, or to both.

The VPLMN shall be able to provide to a roaming UE Inter-System Mobility Policies and/or Inter System Routing Policies. Such policies shall be valid only in the VLPMN or in a PLMN equivalent to the VPLMN, as per roaming agreements.

The Home PLMN (HPLMN) shall be able to provide to a roaming UE Access Network Discovery information for 3GPP and non-3GPP access networks that provide connectivity to the HPLMN or to a PLMN equivalent to the HPLMN, or to both.

The HPLMN shall be able to provide to a roaming UE Inter-System Mobility Policies and/or Inter System Routing Policies.

When the UE receives Inter System Routing Policies from the HPLMN and the VPLMN, it shall select the active rule.

When the UE receives Inter System Mobility Policies from the HPLMN and the VPLMN, it shall select the active rule.

The VPLMN shall not provide Inter-APN Routing Policies, and the UE shall ignore any Inter-APN Routing Policy, which is delivered by a VPLMN.

The multi-access network discovery and selection mechanism shall not interfere with the existing 3GPP PLMN selection mechanisms used for the 3GPP Access Technologies and with the existing 3GPP2 network selection mechanisms. The multi-access network discovery and selection procedures defined in following description include a WLAN access selection procedure and a PLMN selection procedure for WLAN access, which are different from and shall not be used in conjunction with the procedures for I-WLAN access. For WLAN access selection and PLMN selection, the procedures defined in the present document replace I-WLAN procedures.

The ANDSF's policy and the UE implementation shall ensure that PLMN changes are not conducted more often than the time stored in the USIM for the "periodic network selection attempts".

A change between the HPLMN and another PLMN equivalent to the HPLMN can be triggered by the ANDSF, but is not considered a PLMN reselection.

Access Network Discovery and Selection Function (ANDSF)

The ANDSF contains data management and control functionality necessary to provide network discovery and selection assistance data as per operators' policy. The ANDSF shall respond to UE requests for access network discovery information (pull mode operation) and may be able to initiate data transfer to the UE (push mode operation), based on network triggers or as a result of previous communication with the UE.

In this Release, the OMA DM Push mechanism may not work in all possible scenarios and the ANDSF may not always be able to initiate a session to the UE.

The usage of ANDSF capabilities is intended for scenarios where access-network level solutions are not sufficient for the UE to perform Network Discovery and Selection of non-3GPP technologies according to operator policies.

The ANDSF shall comply with regulatory requirements pertaining to the privacy and confidentiality of user location information.

Subject to operator's configuration, the ANDSF may obtain the permanent UE identity, e.g. based on the security solution.

The H ANDSF in the subscriber's home operator network may interact with other databases such as the HSS user profile information residing in subscriber's home operator network. Details of such interaction with these databases are not described in this Release of the specifications.

The ANDSF shall be able to provide various types of information, e.g. inter-system mobility policy, network access discovery information, etc. These types of information are specified in the following clauses.

The ANDSF may provide to UE all types of information or only one of them.

The H-ANDSF selects the types of information to be delivered to the UE according to the operator requirements and the roaming agreements. If the permanent UE identity is known to the H-ANDSF, and subject to operator's configuration, the available subscription data (e.g. the list of access networks, or access technology types, the UE is authorized to use, etc.) may also be used by the H-ANDSF for selecting the inter-system mobility policies, the access network discovery information, the inter-system routing policies and the inter-APN routing policies.

The V-ANDSF selects the types of information to be delivered to the UE according to the operator requirements and the roaming agreements. However, the V-ANDSF shall not deliver IARP policy to a roaming UE.

The ANDSF shall be able to limit the amount of information provided to the UE based e.g. on the UE's current location, UE capabilities, etc. The ANDSF shall be able to limit the load caused by the UE initiated requests towards the ANDSF.

The information provided by ANDSF may also be pre-configured by the home operator on the ME or provisioned on the UICC. The UE shall use the ANDSF information in the following order:

1) ANDSF information provided by the ANSDF server to the ME;

2) ANDSF information configured on the UICC (Universal Integrated Circuit Card);

3) ANDSF information pre-configured on the ME.

The visited operator cannot pre-configure ANDSF information in the UE.

Access Network Discovery Information

Upon UE request, the ANDSF may provide a list of access networks available in the vicinity of the UE for all the access technology types requested by the UE (if any requested).

The ANDSF provides information for access networks that are available to the UE including:
- the access technology type (e.g. WLAN, WiMAX).
- the radio access network identifier (e.g. the SSID (Service Set Identifier) of a WLAN).
- other technology specific information, e.g. one or more carrier frequencies.
- validity conditions, i.e. conditions indicating when the provided access network discovery information is valid (such conditions may include e.g. a location).

The UE may retain and use the access network discovery information provided by the ANDSF until new/updated information is retrieved.

Unified Access Network Discovery and Selection

As discussed above, in a 3GPP access network selection operation, a UE in an idle mode receives 3GPP access network-related information configured in an eNB from the eNB and discovers/selects an appropriate 3GPP access network through RS scanning on the basis of the corresponding information. Also, in the operation of selecting a non-3GPP access network, the UE receive non-3GPP access network-related information from a network entity called "ANDSF" and discovers/selects an appropriate non-3GPP access network on the basis of the corresponding information. The ANDSF supports both a push mode and a pull mode.

As mentioned, in the LTE network, a UE is supposed to separately receive information used for selecting a 3GPP access network and information used for selecting a non-3GPP access network from different network entities. Thus, since procedures for selecting the 3GPP access network and the non-3GPP access network are not standardized, it is not easy for an operator to flexibly cooperatively operate a UE with the 3GPP access network and the non-3GPP access network. Also, since a UE or a network uses different access network selection schemes/procedures according to access network types, complexity of the UE and the network is increased.

Thus, hereinafter, a method for selecting an access network of a UE standardized between a 3GPP access network and the non-3GPP access network to allow the UE and 3GPP and non-3GPP access networks to be dynamically/flexibly connected with each other is proposed. Also, hereinafter, a method for updating a policy used for an operator to select an appropriate access network according to network situations is also proposed.

FIG. 6 illustrates a basic network structure to which the present invention can be applied.

Referring to FIG. 6, a UE has an interface defined with a control plane of a network. The control plane may be configured to include various network functions (e.g., mobility management (MM), session management (SM), policy control, user context DB, etc.) in a cloud form. Or, the control plane may be configured to include network entities distinguished by functions, rather than in the cloud form, and each network entity may have an interface defined with a UE.

Also, the UE may have an interface defined with an access network (AN). Here, the AN may be an eNB of an LTE system and when the AN is classified into a user plane and a control plane, the AN may have an interface defined with the control plane.

FIG. 7 illustrates a network discovery and selection architecture to which the present invention can be applied.

In this disclosure, a network control plane function called "network discovery and selection (NDS)", a network entity/node supporting network discovery and selection of a UE 7010. The NDS may support the UE 7010 to select an appropriate access network from a network pool including 3GPP and non-3GPP access networks (or 3GPP and non-3GPP access network-integrated network pool).

Referring to FIG. 7, the NDS function may have interfaces defined with an MM function, an SM function, a policy (control) function, a user context DB, and the like. Also, the NDS function may have an interface directly defined with the UE 7010 and/or an interface defined with the AN 7020. The SM, MM, policy functions, and UE context DB may be expressed as one control plane function, and at least some of them may be grouped to one function.

Referring to the NDS procedure for discovering/selecting an AN by the UE 7010 proposed in this disclosure, first, the UE 7010 may request an NDS rule, information used for discovering and selecting a network, from the AN 7020. Here, the NDS rule may be information/rule/policy required/used for the UE 7010 to select an AN, and may be referred to as "NDS information" or "NDS policy". To this end, the UE 7010 may transmit an NDS rule request message including capability information and/or location information (e.g., cell ID) to the AN 7020. Thereafter, upon receiving the NDS rule request message, the AN 7020 may transmit a policy request message requesting information regarding an NDS rule to an NDS function.

The NDS function may request information for generating an NDS rule from the SM, MM, and policy functions and the UE context DB and receive the information therefrom. Thereafter, the NDS function may generate (or update) a new NDS rule on the basis of information received from each network node and the UE 7010, and transmit a policy response message including the NDS rule generated as a response with respect to the policy request message from the AN 7020 to the AN 7020. The AN 7020 may transfer the NDS rule included in the received policy response message to the UE 7010.

Or, unlike the case in which the UE 7010 requests/receives the NDS rule through the AN 7020 as in the aforementioned example, in cases where an interface directly connecting the UE 7010 and the NDS function is defined, the UE 7010 may directly request/receive the NDS rule from the NDS function through the corresponding interface. Here, an NDS rule request/response message transmitted through the corresponding interface may also include capability information and/or location information (e.g., a cell ID) of the UE 7010 as in the aforementioned embodiment.

A specific embodiment regarding the NDS procedure of the UE 7010 will be described in detail with reference to FIG. 11 hereinafter.

According to the present embodiment, since the NDS rule for discovering/selecting a 3GPP access network and a non-3GPP access network is integrally managed by the NDS function, the NDS procedure is simplified to reduce complexity of the UE 7010 and the network. In addition, since the NDS function updates/generates the NDS rule reflecting the capability of the UE 7010 and all information received from each network node, the UE 7010 may be able to discover/select an appropriate access network in consideration of a current network situation.

If NDS information is transferred by U-plane interface, a UE needs to know NDS address. When a UE is attaches to the NextGen core, core network provides NDS address (FQDN or IP address) to the UE through control signaling regardless of access network (i.e. 3GPP access or Non-3GPP access). H(Home)-NDS address may be configured in UE.

NDS configuration may be configured in the UE and be updated dynamically. UE may request NDS information to the NDS Function and the NDS Function may also provide (or push) the NDS information to the UE. It is up to UE implementation how often it requests NDS information. For example, when the UE has no valid NDS information or when validity time related to the update duration of the NDS information is expired, the UE shall request NDS information to the NDS function.

NDS configuration may be configured in eNB to reduce signaling between UE and NDS Function. When eNB has NDS information, eNB may send the NDS information to the UE using SIB or dedicated signaling. Here, the NDS information stored in the eNB may have only access network information supported by the surrounding eNB/cell according to the location of the eNB. For example, cell/eNB around the cell/eNB where the UE is camping can only support a certain frequency band, RAT. The network supports 5G New RAT, evolved E-UTRA, and WLAN, but not all RATs may have full coverage. For example, 5G New RAT can be deployed only in hotspot format. In this case, depending on the eNB/cell where the UE is camped, NDS information may not include 5G New RAT information.

NW (Network) and/or RAN entity may provide various information (i.e. load, congestion) to the NDS Function. NDS Function may update its rule (i.e. NDS rule/information/policy) by considering the received information.

NDS function may request session and mobility related information to the MM, function, Policy function, SM function and/or UE Context DB.

NDS function may retrieve active session information to decide whether current session needs session continuity. If UE has active session that requires session continuity, NDS may provide NDS rule so that UE frequent handover is not occurred. For example, NDS may provide below 6 GHz cell/frequency/WLAN information to reduce handover. Same principle may be applied to the UE according to mobility information. According to mobility level of UE, NDS may provide different cell/frequency/WLAN information. For example, NDS may provide above 6 GHz cell/frequency/WLAN information to increase throughput when UE has low or no mobility.

That is, to sum up, the NDS function may configure/update an NDS rule on the basis of session and/or mobility-related information received from the NW and/or RAN entity, and transmit the configured/updated NDS rule to the UE.

After PLMN selection is finished, the UE needs to select an access network used for network attachment.

When the UE has no valid NDS information, the UE select an access network by implementation dependent mechanism.

When the UE has valid NDS information, the UE shall use the NDS information to select an access network. NDS information includes RAT Type, priority, frequency, load information and/or radio related parameters such as signal quality.

After PLMN selection is finished, the UE needs to select an access network based on the priority information included in the valid NDS information. After the access selection is performed, the UE needs to select cell, frequency and/or WLAN AP which is suitable to initiate attach procedure. For this, the UE shall perform scanning RF channels and WLAN APs which are in NDS policy.

If 3GPP and Non-3GPP access networks have same priority, UE shall scan both 3GPP RF channels and WLAP AP channels, and select an access network that provides better signal quality.

For example, a case in which the UE receives NDS information including the following information may be assumed.

3GPP access—1.8 GHz frequency—Maximum throughput: 150 Mbps, Signal strength: 70% (RSRP (Reference Signal Received Power)>xValue), Cell id: Cell #1, priority 1

3GPP access—1.8 GHz frequency—Maximum throughput: 150 Mbps, Signal strength: 70% (RSRP>xValue), Cell id: Cell #2, priority 2

3GPP access—2.4 GHz frequency—Maximum throughput: 150 Mbps, Signal strength: 60% (RSRP>yValue), Cell id: Cell #3, priority 3

3GPP access—2.4 GHz frequency—Maximum throughput: 150 Mbps, Signal strength: 60% (RSRP>yValue), Cell id: Cell #4, priority 4

Non-3GPP access—5 GHz frequency WLAN AP—SSID: WLAN_3GPP_OP—Maximum throughput: 300 Mbps, Signal strength: 80% (RSSI>zValue), priority 5

Here, the UE may measure an actual radio signal by (RF) scanning each of 1.8 GHz and 2.4 GHz 3GPP cells on the basis of the received NDS information. Also, the UE may measure a radio signal by (RF) scanning a 5 GHz WLAN AP having WLAN_3GPP_OP as an SSID on the basis of the received NDS information.

It may be assumed that a cell #1 radio signal of 3GPP 1.8 GHz is 40%, cell #2 is 60%, a radio signal of cell #3 of 3GPP 2.4 GHz is 65%, cell #4 is 40%, and signal strength of a WLAN AP is 90% according to the measurement results. Here, since the 3GPP 1.8 GHz cell #1, cell #2, and 3GPP 2.4 GHz cell #4 do not satisfy minimum signal strength 70% and 60% indicated by the NDS information, 3GPP 2.4 GHz cell #3 having higher priority, among the other remaining two access networks (i.e., 3GPP 2.4 GHz cell #3 and WLAN), may be selected by the UE.

In this example, the NDS function provides information as much as possible to the UE, and the UE performs (RF) scanning on every access network included in the NDS information and selects a specific access network (cell/WLAN) comprehensively in consideration of scanning performing results and NDS information.

In this example, however, since the UE should perform RF scanning on a large number of access networks, a delay time and power consumption of the UE are disadvantageously increased in selecting the access networks. Thus, in order to solve such a problem, the NDS function may provide only minimum information required for the UE to perform NDS, as an NDS rule, to the UE.

However, as an amount of information provided to the UE is smaller, signaling may be more frequently generated between the NW and the UE each time mobility of the UE occurs. Thus, the NDS function may provide to the UE an NDS rule generated/updated by additionally considering/utilizing information such as mobility information of the UE, a current battery state of the UE, and the like. Here, the NDS function may receive the mobility information of the UE as capability information of the UE or may receive the mobility information of the UE as MM-related information from the MM function.

Also, in cases where the NDS function provides the NDS rule to the UE through the AN (e.g., eNB), the AN (e.g., eNB) may configure/update a radio parameter of the NDS rule to fit to a current communication environment/situation of the eNB according to an NDS configuration of the operator, and provide the same to the UE.

When UE requests NDS information by transmitting the NDS rule request message, the NDS rule request message may include location information (e.g. cell id, tracking area, geographical location information) and radio capability of UE. If the location information is included in the NDS rule request message, NDS function may provide specific location information to reduce overall signalling message. If the radio capability is included in the NDS rule request message, NDS function (only) provides cell/frequency information according to the radio capability of UE.

Basically, UE behavior in idle mode for cell reselection is similar with cell selection procedure except that there is a candidate cell list according to UE location (e.g. based on cell id, ran routing area id, tracking area id). UE shall try to select candidate cells unless there is no cell available. If there is no suitable cell in candidate cell list, UE shall perform full RF scanning according to its radio capability in current 3GPP access. If UE cannot find suitable cell, UE shall start cell selection procedure excluding current 3GPP RAT.

FIG. 8 illustrates management object (MO) of NDS rule/information according to an embodiment of the present invention.

The MO of FIG. 8 is an MO for cell selection and may be set to be different by radio access technologies (RATs). A field for checking validity of a corresponding NDS rule is present in each RAT type, and the field may be set to be valid only for location information (e.g., cell ID, tracking area, geographical location information, etc.), time information (e.g., specific time interval, deadline, start time information, etc.) and/or a specific IP flow. That is, the NDS rule may inform only a UE which uses a specific IP flow about to which cell/frequency it should move. If the UE has several IP flows, the UE may select to which cell/frequency it will move on the basis of an IP flow with highest priority.

The NDS rule may include different information according to RAT types. In detail, the NDS rule may include different information regarding 3GPP access and regarding non-3GPP access.

For example, the information regarding 3GPP access may include information such as a priority and mobility level of each frequency, session continuity support and/or radio signal strength. The mobility level, information indicating a mobility frequency/degree of the UE, may be classified into static, low, mid and/or high and may be configured/changed on the basis of information received from the MM function or the UE context DB. The session continuity support, information indicating whether continuity of a session is required, may be configured/changed on the basis of information received from the SM function or the UE context DB.

For example, the information regarding the non-3GPP access may include information such as an ID value for discovering (or identifying) a specific WLAN AP or access network like a homogeneous ESS (HE) SSID, an SSID, a basic service set identifier (BSSID), radio signal strength, and the like, in addition to frequency and priority information for distinguishing a WLAN.

Also, the information regarding the 3GPP and non-3GPP access may commonly include information such as background throughput or a congestion situation. Or the corresponding information may be included in a field for checking validity.

The NDS function may set/instruct a different network node and/or access network node to inform about a specific event (e.g., signal congestion, radio signal quality, traffic load, etc.) when the specific event occurs. The NDS function may update the NDS rule appropriately according to a current network situation on the basis of event information received from different nodes.

Hereinafter, effective network discovery and selection solutions according to an embodiment of the present invention are proposed.

1. First Solution

FIG. 9 illustrates a network discovery and selection architecture to which the present solution.

The reference points depicted in the FIG. 9 are assumed as below for the proposed solution description.

NG_1: Reference point between the UE and the Access Network (AN)

NG_2: Reference point between the AN and the Network Discovery and Selection (NDS) Function NG_3: Reference point between the NDS Function and the Policy Function In this solution, following terminologies are defined:

NDS Rule: Network discovery and selection rule used by the UE. The UE may use information in the NDS Rule to discover and select access network. NDS Rule may be preconfigured in the UE and updated by the network.

Radio Access Point (RAP): Radio access point is an entity that transmits and receives radio signal. In cellular network, RAP is same with cell. In WLAN, RAP is same with WLAN Access Point (AP).

RAP List: A record of RAPs found by the UE by performing RF scan.

The NDS Function generates NDS Rule based on operator policy received from the Policy Function. The NDS Function configures the NDS Rule in the AN (i.e. eNB). The AN (i.e. eNB) may update radio related parameters in the NDS Rule according to its local radio environment when the NDS Function allows it.

The AN provides the NDS Rule to the UE by broadcast (e.g. SIB) or dedicated signalling. When the UE receives the NDS Rule, the UE stores it and may use the NDS Rule when selecting Radio Access Points (RAPs)(i.e. cell selection, cell reselection, WLAN selection). The NDS Rule may contains priority, validity conditions, RAP information (i.e. cell identity, WLAN SSID and frequencies) and/or radio conditions (i.e. RSRP, RSSI (Received Signal Strength Indicator).

The UE may scan RF frequencies indicated in the NDS Rule. If the NDS Rule provides equal priority to multiple access network (i.e. eLTE and WLAN have same priority), the UE may scan both eLTE RF and WLAN APs, and make a RAP List which only contains RAPs that satisfies NDS Rule. After completing the RAP List, the UE selects one RAP which has best signal quality in the RAP List. If eLTE cell is selected, the UE camps on the cell. If WLAN AP is selected, the UE makes an association with WLAN AP.

TABLE 2

| Access | Priority | Career Frequency | Signal Strength | Cell List | SSID |
|---|---|---|---|---|---|
| eLTE | 2 | 1.8 GHz | RSRP > −90 dBm | All | |
| eLTE | 1 | 2.2 GHz | RSRP > −85 dBm | All | |
| New RAT | 3 | 26.0 GHz | RSRP > −75 dBm | All | |
| WLAN | 4 | 5 GHz | RSSI > −60 dBm | | WLAN_A |

Table 2 shows example of NDS Rule. When the UE has the NDS Rule of Table 2 and needs to select access network, the UE perform scanning 2.2 GHz eLTE frequency first because it has highest priority. Based on the scan result, the UE make a RAP List which contains RAPs with actual signal strength exceeds −85 dBm. The UE may select a RAP (or cell) with highest signal strength among RAPs in the RAP List.

If RAP List is empty after scan 2.2 GHz eLTE, then UE repeat same procedure on lower priority access network until the UE make a non-empty RAP List. If the UE cannot complete/make RAP List which satisfies the NDS Rule after scanning lowest priority access, the UE make a RAP List which does not satisfies NDS Rule in priority order. If the UE successfully completes/makes a RAP List, the UE select one RAP in the RAP List. If the UE fails to make RAP List again, the UE starts full RF scan based on UE's capability and completes/makes a RAP List.

When the NDS Rule provides multiple accesses with same priority, then the UE may scan all accesses with same priority. For example, if it is assumed that a priority of WLAN is identical to a priority of 2.2 GHz eLTE in Table 2, then the UE may scan both 2.2 GHz eLTE and 5 GHz WLAN, and make a RAP List.

If operator wants to make a UE to remain in 3GPP access as much as possible, it can be achieved by configuring WLAN priority lower than 3GPP access or by not providing WLAN information to the UE. Also it can be possible that operator can configure that a UE connects to the core network using WLAN in a specific location (e.g. home of the UE) by adding location based validity constraints.

2. Second Solution

The second solution introduces the high-level solution for PLMN selection and multiple access selection.

FIG. 10 represents a network discovery and selection architecture for the proposed second solution.

The following reference points are assumed for the proposed second solution description.

NG1: Reference point between the UE and the CP functions

NG2: Reference point between the RAN and the CP functions

NG8: Reference point between the NDS function and the Policy Function

In this second solution, following terminology is defined:

NDS Rule: Network discovery and selection rule used by the UE. The UE uses this NDS rule/information to discover and select access network (e.g. PLMN selection and/or multiple access selection). NDS Rule may be preconfigured in the UE and updated by the network.

The NDS function generates NDS Rule based on UE subscription, UE Capability, MM Context, SM Context and/or policy received from the Policy Function.

The NDS Rule contains at least following parameters:

Rule Priority: It represents the priority given to one particular rule. The UE applies the NDS Rule in order of Rule Priority.

Validity Condition: It represents validity condition of the NDS Rule. It may include PLMN, time, location and RAN specific parameters. This field is optional and if there is no Validity Condition, the NDS Rule is always considered as a valid rule.

Access Information: It represents specific access the UE should connect. Access Information may contain PLMN, RAT Type, Frequency and/or WLAN Information. Access Information may include multiple access information (e.g. 3GPP access and WLAN access). The multiple access information includes information on a plurality of accesses which the UE can access. When multiple access information exists, there exists a field whether the access is mandatory or optional.

The NDS Function may provide the NDS Rule to the UE during the MM (e.g. initial attach, location update) and/or SM (e.g. PDU session establishment) procedure through the NG1 interface. When the UE receives the NDS Rule, the UE stores the NDS rule. The received NDS rule takes precedence over the pre-configured NDS Rule.

When the UE has a valid NDS Rule and needs to select access network, the UE tries to discover and select specific access network based on the information in the NDS Rule. For example, when the UE power up, it discovers and select proper PLMN based on the NDS Rule preconfigured in the UE.

The NDS Rule may contain Access Information regarding 3GPP access and/or WLAN access. The UE may attach through specific access of which priority is the highest among available accesses indicated in the Access Information.

If the UE has/receives a valid NDS Rule with multiple Access Information, the UE tries to connect multiple accesses (e.g. 3GPP access and/or WLAN access) indicated by the Access Information simultaneously. If the UE fails to discover or connect to both accesses (3GPP access and/or WLAN access) simultaneously, the UE may connect the access that is indicated as a mandatory access network in the NDS rule.

For example, NDS Rule may include/indicate 3GPP access as a mandatory and non-3GPP access as an optional access. Then the UE may connect at least 3GPP access when it fails to connect both accesses simultaneously. This can be happen during the location update procedure. If the NDS Function updates NDS Rule with multiple Access Information during location registration procedure, this NDS Rule triggers the UE to select multiple accesses simultaneously.

So far, the network discovery and selection solutions of the UE based on the NDS rule have been described. Hereinafter, the network discovery and selection solutions of the UE will be described in detail.

FIG. 11 is a flow chart illustrating a network discovery and selection method of a UE according to an embodiment of the present invention. All the embodiments/solutions described above may be applied in relation to the flow chart, and here, redundant descriptions will be omitted.

1. First, in cases where there is no received/configured NDS rule or a condition for requesting the NDS rule is met, the UE may request the NDS rule from the NDS function. To this end, the UE may transmit an NDS request message including (radio) capability information, location information and/or mobility information thereof to the NDS function. Examples of each information are as follows.

Capability information (information regarding an access network, or the like, that can be supported by the UE): supported frequency band information, WLAN support information, support information of UTRAN/E-UTRAN/5G RAT, etc.

Location information (information regarding current location of UE): Information regarding a cell in which the UE is currently camped, tracking area information, GPS information, etc.

Mobility information (information regarding mobility of UE): movement frequency level information of UE (e.g. static/low speed/high speed), estimated movement route and speed information (e.g., movement path information estimated by interworking with a navigation, or the like, and movement speed information of the UE estimated using traffic information, or the like, when the UE is a vehicle), etc.

2. In cases where an NDS rule is requested by the UE or in cases where a new NDS rule should be configured in/transmitted to the UE according to an operator policy, the NDS function may request information regarding the UE from the AMF (Access and Mobility Management Function) and/or SMF (session management function). Here, AMF corresponds to the MM function described above.

2a-2b. In detail, the NDS function may request mobility information of the UE (e.g., movement speed of the UE, location information of the UE, and the like) from the AMF.

2c-2d. Also, the NDS function may request session of the UE (e.g., whether service continuity of a session of the UE should be supported, active/inactive state information of the session, etc.) from the SMF.

3. The NDS function may generate an NDS rule to be configured in/transmitted to the UE on the basis of information received from the UE at the first stage and information received from the AMF and/or SMF at the second stage.

Here, the NDS rule may be generated according to various embodiments as follows.

In a first embodiment, the NDS function may selectively generate only the NDS rule regarding radio supportable by the UE when generating the NDS rule on the basis of UE capability information received from the UE at the first stage.

For example, in cases where the network supports all of 5G RAT (below 6 GHz), 5G RAT (above 6 GHz), enhanced E-UTRA, and WLAN but the UE does not have capability regarding specific radio (i.e., the UE does not support the specific radio), the NDS function does not include the corresponding specific radio in the NDS rule.

However, although UE capability information received by the network (e.g., the AN function) indicates that the UE does not have capability regarding the specific radio (i.e., the UE does not support the specific radio), if the NDS function knows that the UE has capability regarding the specific radio through subscription regarding the UE and/or previous access history of the UE, the NDS function may include the corresponding radio in the NDS rule (or may configure the NDS rule regarding the corresponding radio and transmit the same to the UE).

For example, when the user deactivates the WLAN function of the UE, the UE may transmit capability information indicating that the UE does not have capability regarding the WLAN when transmitting capability information thereof to the network. However, in cases where the NDS function knows that the UE is accessible through the WLAN through subscription or access history of the UE, the NDS function may include WLAN in the NDS rule and transmit the same to the UE so that the user may immediately use WLAN when activating the WLAN function.

Also, a vehicle such as a police car, a fire engine, and the like, or a UE used by a policeman or a firefighter may be allocated a specific radio that can be used only in an emergency situation. For example, in cases where the UE inserts an indication informing about an emergency situation into a message requesting the NDS rule, the NDS function may include a special radio used only in a disastrous or emergency situation in the NDS rule and transmit the same to the UE. Such a UE requests the NDS rule like a general UE, but in the emergency situation, the UE may receive an NDS rule for accessing a separate dedicated radio network by including an emergency indication in an emergency situation.

In a second embodiment, in cases where the NDS function receives information indicating that the UE has a session requiring session continuity from the SMF, the NDS function may generate an NDS rule such that the UE may select a radio covering a wide area in order to prevent frequent occurrence of handover such as inter-RAT or intra-RAT. For example, in cases where the UE supports all of 5G RAT (above 6 GHz), Enhanced E-UTRA, and WLAN, the NDS function generates an NDS rule which sets low priority for the 5G RAT (above 6 GHz) or the WLAN having small radio coverage, relative to other radios, and which sets highest priority of the enhanced E-UTRA, and transmits the generated NDS rule to the UE.

However, although the UE has a session requiring session continuity, if a mobility level thereof is low (or if the UE does not have mobility), radio coverage is not important. Thus, the NDS function may generate an NDS rule such that the UE may select/use radio allowing a more stable service with high throughput to be received. For example, in cases where the UE supports all of 5G RAT (above 6 GHz), Enhanced E-UTRA, and WLAN, since 5G RAT (above 6 GHz) provides a highest data rate, the NDS function may generate an NDS rule by setting the 5G RAT (above 6 GHz) to have highest priority so that the UE may select the 5G RAT (above 6 GHz).

In a third embodiment, in cases where location information and/or mobility information of the UE is received from the UE and/or the AMF, the NDS function may generate an NDS rule using (or in consideration of) the corresponding information. If a mobility level of the UE is low (or when the UE does not have mobility), the NDS function may generate an NDS rule such that the UE may select radio allowing the UE to produce higher throughput.

For example, in cases where the UE supports all of 5G RAT (above 6 GHz), Enhanced E-UTRA, and WLAN, the NDS function may generate an NDS rule by setting the 5G RAT (above 6 GHz) capable of producing maximum throughput to have highest priority. However, since throughput is affected by signal strength regarding an actual radio or by UEs that use the corresponding radio together, the NDS function may include/add information such as background throughput, congestion situation, and the like, in validity information of the NDS rule.

When the UE transmits mobility information thereof to the NDS function, the UE may send a previously estimated movement path thereof to the NDS function. For example, a vehicle or a UE attached to the vehicle may estimate a movement path thereof on the basis of navigation and/or road information, and here, the UE may transmit such information as capability information thereof to the NDS function. In this manner, in cases where movement path estimation information is received from the UE or when a network is able to estimate mobility of the UE, the NDS function may generate an NDS rule such that a radio appropriate for the movement path of the UE can be selected.

For example, in cases where a region of an estimated movement path of the UE does not support a specific radio, the NDS function may generate an NDS rule by excluding the corresponding radio, or conversely, in cases where a region of the estimated movement path of the UE supports the specific radio, the NDS function may generate an NDS rule by including the corresponding radio.

In an fourth embodiment, in order to prevent an increase in signaling overhead as the UE frequently requests the NDS rule, the NDS function may configure an NDS rule request condition under which the UE may request an NDS rule. The NDS rule request condition may correspond to a case in which the UE has only a session without session continuity and a new session requiring session continuity is configured, a case in which a mobility level of the UE is suddenly increased, a case in which the UE moves out of a preset area (e.g., in a case where the UE moves out of a specific TA or a geographical area, etc.), a case in which a specific radio/throughput condition is met (e.g., a case in which signal strength is reduced to below a predetermined level and background throughput is increased to above a predetermined level, etc.), and/or validity regarding every radio indicated by an NDS rule is not met. The UE may request an NDS rule from the NDS function only when these NDS rule request conditions are met.

4. Finally, the NDS function may transmit an NDS rule generated at the third stage to the UE. According to an embodiment, in cases where the NDS rule request condition is configured/generated, the NDS rule request condition may also be transmitted together with the NDS rule to the UE. When the NDS rule is received, the UE may select a radio according to the NDS rule, and when the NDS rule request condition is received, the UE may request an NDS rule according to the NDS rule request condition.

According to the embodiments and solutions described above, a network discovery and selection procedure of the UE is more simplified and, since the UE may freely select a network, regardless of RAT type, flexibility may be increased in selecting a network.

FIG. 12 is a flow chart illustrating an operation method of a network node for supporting network discovery and selection of a UE according to an embodiment of the present invention. In relation to the flow chart, the aforementioned embodiments may be applied in the same/similar manner and redundant descriptions will be omitted. Also, the network node of the flow chart may be the NDS function described above.

First, the network node may receive an NDS rule request message requesting an NDS rule from a UE (S1210). The NDS rule request message may include capability information regarding an RAT type supported by the UE and/or location information of the UE. Here, the RAT type may correspond to UTRAN (universal terrestrial radio access network), GERAN (Global Evolution Radio Access Network), E-UTRAN (evolved universal terrestrial radio access network), evolved E-UTRAN, NEW RAT, WLAN (Wireless Local Area Network), fixed broadband access network and/or Bluetooth network. Also, the location information of the UE may include information regarding a cell in which the UE is camped, a tracking area and/or GPS (Global Positioning System).

Next, the network node may transmit a policy request message requesting NDS rule generation support information for generating an NDS rule to at least another network node (S1220). For example, the NDS rule generation support information may include session continuity support information indicating whether a session established for the UE is a session requiring continuity.

Thereafter, the network node may receive a policy response message including NDS rule generation support information from at least another network node (S1230). In cases where the session continuity support information indicates that the session established for the UE is a session requiring continuity, the network node may set highest priority, starting sequentially from a network with widest coverage, among networks included in the NDS rule, in generating an NDS rule.

Subsequently, the network node may generate an NDS rule on the basis of the NDS rule request message and the policy response message (S1240).

Thereafter, the network node may transmit an NDS rule response message including the generated NDS rule to the UE (S1250). The NDS rule may include information regarding networks that can be discovered and selected by the UE and priority information of the networks, and here, at least some of the networks may have different RAT types.

Also, the NDS rule request message or the NDS rule generation support information may include mobility information regarding a movement frequency level of the UE. If the mobility information indicates that the movement frequency level of the UE is lower than a preset reference, the network node may set highest priority, starting sequentially from a network with highest throughput, among the networks included in the NDS rule.

Also, the NDS rule may include information regarding a condition for the UE to request an NDS rule. Such a condition may be configured to a case in which a movement frequency level of the UE is changed to be greater than a preset reference and/or to a case in which a session requiring continuity is newly established in the UE.

FIG. 13 is a flow chart illustrating a network discovery and selection method of a UE according to an embodiment of the present invention. In relation to the flow chart, the aforementioned embodiments may be applied in the same/similar manner and redundant descriptions will be omitted.

First, the UE may transmit an NDS rule request message requesting an NDS rule to the network node (S1310). Here, the NDS rule request message may include capability information regarding an RAT type supported by the UE and/or location information of the UE.

Next, the UE may receive an NDS rule response message including an NDS rule generated on the basis of the NDS rule request message from the network node (S1320).

Thereafter, the UE may discover and select a network on the basis of the NDS rule (S1330). The NDS rule may include information regarding networks that can be discovered and selected by the UE, priority information of the networks, and minimum signal strength information set for each network, and at least some of the networks may have different RAT types. The UE may perform radio frequency (RF) scanning on the networks in order indicated by the priority information, and select a network with higher priority among networks having a signal strength obtained through the RF scanning measured to be stronger than a minimum signal strength set for each network If the NDS rule includes multiple access information regarding a plurality of networks that the UE may be able to simultaneously access, the UE may simultaneously select the plurality of networks indicated by the multiple access information.

Device to which the Present Invention can be Applied

FIG. 14 is a block diagram illustrating a configuration of a communication device according to an exemplary embodiment of the present invention.

Referring to FIG. 14, a wireless communication system includes a network node 1410 and a plurality of UEs 1420.

The network node 1410 includes a processor 1411, a memory 1412, and a communication module 1413. The processor 1411 implements a function, a process and/or a method suggested in FIGS. 1 to 13. Layers of a wired/wireless interface protocol may be implemented by the processor 1411. The memory 1412 is connected to the processor 1411 to store various information for driving the processor 1411. The communication module 1413 is connected to the processor 1411 to transmit and/or receive a wired/wireless signal. The network node 1410 may be, for example, a base station, an MME, a HSS, a SGW, a PGW, a SCEF, a SCS/AS, and a Prose Function. Particularly, when the network node 1410 is a base station, the communication module 1413 may include a radio frequency (RF) unit for transmitting/receiving a wireless signal.

The terminal 1420 includes a processor 1421, a memory 1422, and a communication module (or RF unit) 1423. The processor 1421 implements a function, a process and/or a method suggested in FIGS. 1 to 13. Layers of a wireless interface protocol may be implemented by the processor 1421. The memory 1422 is connected to the processor 1421 to store various information for driving the processor 1421. The communication module 1423 is connected to the processor 1421 to transmit and/or receive a wireless signal.

The memories 1412 and 1422 may exist at the inside or the outside of the processors 1411 and 1421 and may be connected to the processors 1411 and 1421, respectively, by well-known various means. Further, the network node 1410 (a case of a base station) and/or the UE 1420 may have a single antenna or multiple antennas.

FIG. 15 is a block diagram illustrating a configuration of a communication device according to an exemplary embodiment of the present invention.

Particularly, FIG. 15 is a block diagram specifically illustrating the UE of FIG. 14.

Referring to FIG. 15, the UE may include a processor (or a digital signal processor (DSP)) 1510, a RF module (or RF unit) 1535, a power management module 1505, an antenna 1540, a battery 1555, a display 1515, a keypad 1520, a memory 1530, a Subscriber Identification Module (SIM) card 1525 (this element may be selected), a speaker 1545, and a microphone 1550. The UE may include a single antenna or multiple antennas.

The processor 1510 implements a function, a process and/or a method suggested in FIGS. 1 to 14. A layer of a wireless interface protocol may be implemented by the processor 1510.

The processor 1510 is connected to the processor 1510 and stores information related to operation of the processor 1510. The memory 1530 may exist at the inside or the outside of the processor 1510 and may be connected to the processor 1510 by well-known various means.

The user inputs, for example, instruction information such as a phone number by pressing (touching) a button of the keypad 1520 or by voice activation using the microphone 1550. The processor 1510 processes to perform an appropriate function such as reception of such instruction information and calling with a phone number. Operational data may be extracted from the SIM card 1525 or the memory 1530. Further, for user recognition and convenience, the processor 1510 may display instruction information or driving information on the display 1515.

The RF module 1535 is connected to the processor 1510 to transmit and/or receive an RF signal. In order to start communication, the processor 1510 transfers, for example, instruction information to the RF module 1535 in order to transmit a wireless signal constituting voice communication data. The RF module 1535 is configured with a receiver and a transmitter in order to receive and transmit a wireless signal. The antenna 1540 performs a function of transmitting and receiving a wireless signal. When receiving a wireless signal, the RF module 1535 may transfer a signal in order to process by the processor 1510 and may convert a signal with a base band. The processed signal may be converted to audible or readable information output through the speaker 1545.

According to an embodiment of the present invention, since the NDS rule for discovering/selecting a 3GPP access network and a non-3GPP access network is collectively managed by the NDS function, the NDS procedure may be simplified to reduce complexity of the UE and the network.

Also, according to an embodiment of the present invention, since the NDS function updates/generates an NDS rule reflecting all of capability of the UE and information received from each network node in real time, the UE may discover/select an appropriate access network in consideration of a current network situation.

The effect of the present invention is not limited to the above-described effects and the other objects will be understood by those skilled in the art from the following description In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

An exemplary embodiment of the present invention mainly describes an example applied to a 3GPP LTE/LTE-A system, but can be applied to various wireless communication systems other than the 3GPP LTE/LTE-A system.

What is claimed is:

1. A network discovery and selection supporting method in an operation method of a network node in a wireless communication system, the network node including a communication module and a processor, the network discovery and selection supporting method comprising:
receiving, by the communication module and/or the processor from the UE, a network discovery and selection (NDS) rule request message requesting an NDS rule;
transmitting, by the communication module and/or the processor to at least another network node, a policy request message requesting NDS rule generation support information for generating the NDS rule;
receiving, by the communication module and/or the processor from the at least another network node, a policy response message including the NDS rule generation support information;
generating, by the processor, an NDS rule based on the NDS rule request message and the policy response message; and
transmitting, by the communication module and/or the processor to the UE, an NDS rule response message including the generated NDS rule,
wherein the NDS rule includes information regarding networks available to be discovered and selected by the UE and priority information of the networks, and
wherein at least some of the networks have different radio access technology (RAT) types.

2. The network discovery and selection supporting method of claim 1, wherein the NDS rule request message includes capability information regarding an RAT type supported by the UE and/or location information of the UE.

3. The network discovery and selection supporting method of claim 2, wherein the RAT type corresponds to UTRAN (universal terrestrial radio access network), GERAN (Global Evolution Radio Access Network), E-UTRAN (evolved universal terrestrial radio access network), evolved E-UTRAN, NEW RAT, WLAN (Wireless Local Area Network), fixed broadband access network and/or Bluetooth network.

4. The network discovery and selection supporting method of claim 3, wherein the location information of the UE includes information regarding a cell in which the UE is camped, a tracking area and/or GPS (Global Positioning System).

5. The network discovery and selection supporting method of claim 2, wherein the NDS rule generation support information includes session continuity support information indicating whether a session established in the UE is a session requiring continuity.

6. The network discovery and selection supporting method of claim 5, wherein when the session continuity support information indicates that the session established for the UE is a session requiring continuity, the generating of an NDS rule includes setting highest priority, starting sequentially from a network with widest coverage, among networks included in the NDS rule.

7. The network discovery and selection supporting method of claim 2, wherein the NDS rule request message or the NDS rule generation support information includes mobility information regarding a movement frequency level of the UE.

8. The network discovery and selection supporting method of claim 7, wherein when the mobility information indicates that the movement frequency level of the UE is lower than a preset reference, the generating of an NDS rule includes setting highest priority, starting sequentially from a network with highest throughput among networks included in the NDS rule.

9. The network discovery and selection supporting method of claim 2, wherein the NDS rule includes information regarding a condition for the UE to request the NDS rule.

10. The network discovery and selection supporting method of claim 9, wherein the condition is set to a case in which a movement frequency level of the UE is changed to be greater than a preset reference and/or to a case in which a session requiring continuity is newly established in the UE.

11. A network discovery and selection method of a user equipment (UE) in a wireless communication system, the UE including a communication module and a processor, the network discovery and selection method comprising:
transmitting, by the communication module and/or the processor to a network, a network discovery and selection (NDS) rule request message requesting an NDS rule, the NDS rule request message including capability information regarding a radio access technology (RAT) type supported by the UE and location information of the UE;
receiving, by the communication module and/or the processor from the network node, an NDS rule response message including an NDS rule generated based on the NDS rule request message; and
discovering and selecting, by the communication module and/or the processor, a network based on the NDS rule,
wherein the NDS rule includes information regarding networks available to be discovered and selected by the UE, priority of the networks, and minimum signal strength set for each network, and
wherein at least some of the networks have different RAT types.

12. The network discovery and selection method of claim 11, further comprising:
performing, by the communication module and/or the processor, radio frequency (RF) scanning on the networks in order indicated by the priority information.

13. The network discovery and selection method of claim 12, wherein the discovering and selecting of a network based on the NDS rule is selecting a network with higher priority among networks having a signal strength obtained through the RF scanning measured to be stronger than the minimum signal strength.

14. The network discovery and selection method of claim 11, wherein, when the NDS rule includes multiple access information regarding a plurality of networks that the UE is able to simultaneously access, the discovering and selecting of a network based on the NDS rule is simultaneously selecting the plurality of networks indicated by the multiple access information.

15. A network node for supporting network discovery and selection in a wireless communication system, the network node comprising:
a communication module configured to transmit and receive a signal; and
a processor configured to control the communication module,
wherein the processor is further configured to:
receive, from the UE, a network discovery and selection (NDS) rule request message requesting an NDS rule,
transmit, to at least another network node, a policy request message requesting NDS rule generation support information for generating the NDS rule, receive, from the at least another network node, a policy response message including the NDS rule generation support information, generate an NDS rule based on the NDS rule request message and the policy response message, and transmit, to the UE, an NDS rule response message including the generated NDS rule, wherein the NDS rule includes information regarding networks available to be discovered and selected by the UE and priority information of the networks, and wherein at least some of the networks have different radio access technology (RAT) types.

16. The network node of claim 15, wherein the NDS rule request message includes capability information regarding an RAT type supported by the UE and/or location information of the UE.

17. The network node of claim 16, wherein the RAT type corresponds to UTRAN (universal terrestrial radio access network), GERAN (Global Evolution Radio Access Network), E-UTRAN (evolved universal terrestrial radio access network), evolved E-UTRAN, NEW RAT, WLAN (Wireless Local Area Network), fixed broadband access network and/or Bluetooth network.

18. The network node of claim 17, wherein the location information of the UE includes information regarding a cell in which the UE is camped, a tracking area and/or GPS (Global Positioning System).

19. The network node of claim 16, wherein the NDS rule generation support information includes session continuity support information indicating whether a session established in the UE is a session requiring continuity.

20. The network node of claim 19, wherein, when the session continuity support information indicates that the session established for the UE is a session requiring continuity, the processor is further configured to set highest priority, starting sequentially from a network with widest coverage, among networks included in the NDS rule.

* * * * *